No. 718,959. PATENTED JAN. 20, 1903.
T. WILSON.
GAS REGULATING VALVE.
APPLICATION FILED NOV. 4, 1902.
NO MODEL.
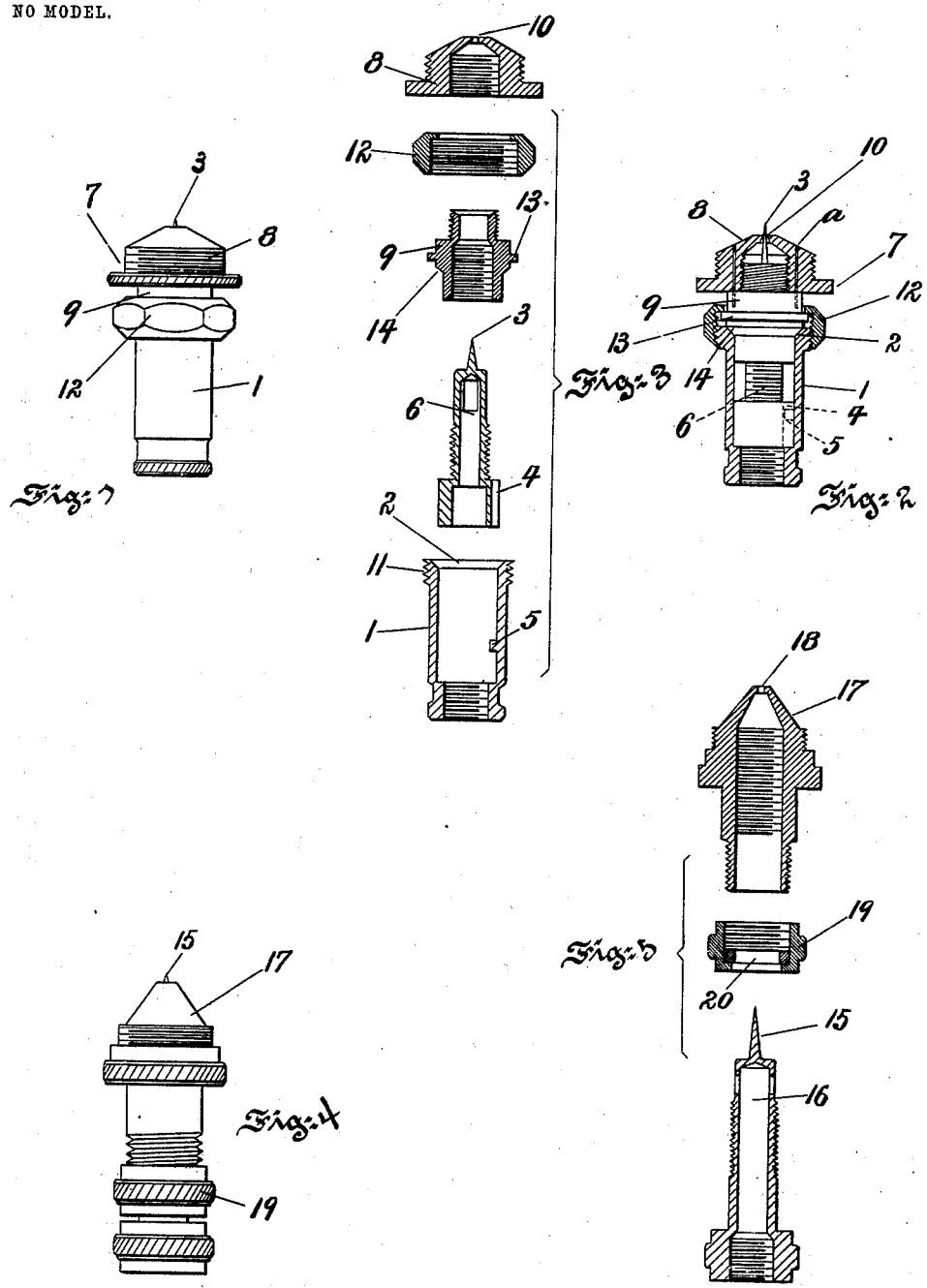
WITNESSES:
INVENTOR.
Thomas Wilson.
BY
Augustus B. Stoughton.
ATTORNEY.

UNITED STATES PATENT OFFICE.

THOMAS WILSON, OF PHILADELPHIA, PENNSYLVANIA, ASSIGNOR TO PENNSYLVANIA GLOBE GAS LIGHT COMPANY, OF PHILADELPHIA, PENNSYLVANIA, A CORPORATION OF PENNSYLVANIA.

GAS-REGULATING VALVE.

SPECIFICATION forming part of Letters Patent No. 718,959, dated January 20, 1903.

Application filed November 4, 1902. Serial No. 130,077. (No model.)

*To all whom it may concern:*

Be it known that I, THOMAS WILSON, a citizen of the United States, residing at the city of Philadelphia, in the county of Philadelphia and State of Pennsylvania, have invented a new and useful Gas-Regulating Valve, of which the following is a specification.

The principal object of the present invention is to provide a gas-regulating valve for high-pressure gas, such as natural gas.

Another object of the invention is to prevent leakage.

Other objects of the invention will appear from the following description.

The nature, characteristic features, and scope of the invention will be more fully understood from the following description, taken in connection with the accompanying drawings and forming part hereof, and in which—

Figure 1 is an elevational view of a gas-regulating valve embodying features of the invention. Fig. 2 is a central sectional view of the same. Fig. 3 is a view principally in section and illustrating the various parts of the valve detached from one another. Fig. 4 is an elevational view illustrating a gas-regulating valve embodying a modification of the invention; and Fig. 5 is a view principally in central section, showing the parts of the valve illustrated in Fig. 4 in a detached position.

In the drawings and with special reference to Figs. 1 to 3, inclusive, 1 is a shell adapted for application to a gas-supply pipe and, as shown, is internally threaded and externally milled for that purpose. This shell is provided at its top with a seat 2, which forms one member of a packing that will be hereinafter described and that prevents leakage. 3 is a needle-valve having a shank fitted so as not to turn in respect to the shell. As shown, the shank is grooved, as at 4, and this groove receives a pin or projection 5, projecting inward from the shell 1. The shank is provided with a gasway 6. As shown, this way extends upward axially from the base and then diametrically, so that the gas can pass through the shank and escape around the needle-valve 3. The cap 7 is shown as consisting of two parts 8 and 9, in use permanently connected together, but made so as to come apart, for a purpose to be presently described. These parts 8 and 9 can be screwed together after white lead has been applied to the threaded parts, and in that way they become, in effect, one piece, and so as to make it clear that they operate as one piece by reason of the presence of white lead, which is difficult to illustrate, I have in Fig. 2 shown some pins *a* for connecting these parts, although I have never found it necessary to use pins. The cap 7 is provided with a needle-hole 10, which coöperates with the needle-valve 3, and it has screw-and-thread connection with the shank 6. The screw-and-thread connection between the cap 7 and the shank 6 is not leaded, and when the cap is turned, for example, by means of its milled edge it screws upward or downward on the shank, and in that way the needle-hole 10 is adjusted in respect to the needle 3, and the gas issuing from the top of the cap is therefore adjusted. As shown, the cap is provided with an exterior thread, which affords means when present for attaching a Bunsen tube, such as is ordinarily used in so-called "incandescent gas-lighting." The exterior of the shell 1 is threaded, as at 11, and the cap is provided with a nut 12, adapted to engage this thread 11. The nut 12 is interposed between the parts 8 and 9 and seats itself upon the shoulder 13, so that it is free to turn. The purpose of making the cap of the two parts 8 and 9 is to provide for the application of the nut 12, and when the nut has been applied these two parts 8 and 9 constitute, in effect, one piece. The cap is provided with a seat 14, adapted to come into engagement with the seat 2, and thus make a tight packing, which prevents any gas escaping that might leak past the loose screw connection between the shank and the cap. The nut 12 when screwed down onto the thread 11 draws the seats 2 and 4 together, and thus makes them effective as a packing. It also, in connection with these seats 2 and 4, serves the function of preventing accidental turning of the cap. To turn the cap to adjust the needle-valve, the nut 12 is loosened, and after the adjustment has been made the nut 12 is tightened.

Referring to Figs. 4 and 5, the needle 15 has its shank made hollow and arranged for attachment to the gas-pipe. As shown, the shank is threaded and milled at its base for this purpose, and it is also provided with an axial and a diametrical gasway 16. The cap 17 is provided with a needle-hole 18 and, as shown, is equipped with a milled edge and with a thread for the Bunsen tube. The cap is internally threaded, so as to engage an external thread on the shank, and this screw connection affords means for raising and lowering the cap by a motion of rotation, so as to adjust the supply of gas escaping through the needle-hole. Of course such a loose screw connection is liable to leak, and a packing is employed to prevent this leakage. As shown, this packing consists of a gland 19, having screw connection with the base of the cap and fitted with a flexible packing 20, so that when the gland is screwed up the packing 20 is compressed onto the shank and in that way prevents leakage and also, if screwed up sufficiently hard, accidental rotation of the cap.

It will be obvious to those skilled in the art to which the invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A gas-regulating valve comprising two members, whereof one is provided with a needle and a gasway and is adapted for attachment to a supply-pipe and whereof the second is provided with a needle-hole and is rotatably mounted on the first to regulate the supply of gas, a screw-thread connection between these members whereby the turning of one changes the relative position of the needle and needle-hole, a packing interposed between these members to prevent leakage between them, and means for tightening and loosening said packing, substantially as described.

2. A gas-regulating valve comprising a needle having a shank provided internally with a gasway, a tubular cap provided with a needle-hole and into which the shank projects, a screw-thread connection interposed between the shank and tubular cap and which permits of movement of the cap in respect to the shank, packing provisions interposed between the shank and cap, and means for tightening and loosening said packing provisions, substantially as described.

3. A gas-regulating valve comprising a shank provided with a needle and with a seat constituting part of a packing and with a gasway, a cap having screw-and-thread connection with said shank and provided with a needle-hole and with a seat arranged to coöperate with the first-mentioned seat, and a nut for clamping and unclamping said seats and permitting and preventing rotation of the cap, substantially as described.

4. A gas-regulating valve comprising a needle having a shank externally threaded and internally provided with a gasway, a shell for the reception of said shank and provided with a seat and with an externally-threaded upper portion, means for preventing rotation of the shank in respect to the shell, a cap provided with a needle-hole and having screw-and-thread connection with said shank, a seat on the cap adapted to coöperate with the first-mentioned seat, and a nut revolubly connected with the cap and adapted to engage the externally-threaded portion of the shell, substantially as described.

5. A gas-regulating valve comprising a cap provided with a needle-hole and with an annular groove and with a seat, a nut engaging said annular groove so as to be free for rotation, a needle provided with a shank having an internal gasway, a shell mounted on the shank and provided with a seat arranged to coöperate with the first-mentioned seat and with a threaded portion arranged to coöperate with said nut, and a screw-and-thread connection between the shank and cap, substantially as described.

In testimony whereof I have hereunto set my name this 31st day of October, 1902.

THOMAS WILSON.

In presence of—
W. J. JACKSON,
K. M. GILLIGAN.